Sept. 8, 1970        H. J. VAESSEN        3,526,928
MANDREL FOR MAKING SAUSAGE CASINGS AND WIRE STRUCTURE THEREFOR Filed Aug. 7, 1967

INVENTOR.
Hubert J. Vaessen
BY
Alvin Browdy
attorney

United States Patent Office 3,526,928
Patented Sept. 8, 1970

3,526,928
MANDREL FOR MAKING SAUSAGE CASINGS
AND WIRE STRUCTURE THEREFOR
Hubert J. Vaessen, 5 Singel, Deventer, Netherlands
Filed Aug. 7, 1967, Ser. No. 658,749
Int. Cl. B29f 3/04
U.S. Cl. 18—14                                    7 Claims

ABSTRACT OF THE DISCLOSURE

A mandrel for making sausage casings provided with a non-smooth surface either by treatment of the outer surface of the mandrel or by providing a removable outer structure such as wire mesh.

---

This invention relates to mandrels for making sausage casings with the use of intestine strips, and more specifically to mandrels provided with non-smooth surfaces, and also to wire structures adapted to be applied to such a mandrel.

The production of sausage casings from intestine strips, either alone or with a coating, is well known. The classical process according to which the casing is exclusively made from intestine strips and some embodiments of a more recent process, wherein a layer made from intestine strips is coated with a layer of macromolecular, preferably proteinaceous material are described in e.g. U.S. Pat. 3,214,277 which is incorporated herein by reference.

Processes of the above kind are used on a commercial scale, and mandrels of several forms and sizes have been developed and used for these purposes. All these known mandrels are made of wood and they have in common that their surface on which the sausage casing is formed is smooth, and it was always believed a matter of course that this was necessary in order to obtain an acceptable product. In order to promote the releasing of the finished dried casing, several more or less complicated devices were developed which permit to change the circumference of the mandrel. When the product has to be removed from the mandrel, its circumference is reduced, and this reduction serves as a release aid.

Of course, it could be expected that the release of the finished casing would be easier with a mandrel having a non-smooth surface, but it appeared so obvious that with such a mandrel it would be impossible to obtain a good uniform product that even in the first and primitive stages of the development of this kind of processes no expert in this field has ever thought of trying such an apparently useless measure.

Surprisingly, it has now been found that a mandrel having a non-smooth surface provides even better casings than the smooth mandrels. The principal effect of the non-smooth surface is that the air which is always entrapped between two layers of these kinds of casings is now present in the form of smaller bubbles, and by virtue thereof the product is stronger and more uniform.

There are many embodiments for the invention, and some preferred embodiments will be discussed hereinbelow.

The effect of this invention is already attained to some extent by a simple roughening of the mandrel surface. Thus, the surface may contain small pointlike projections which may be distributed randomly or, preferably, in a regular way. Still better results are obtained, if the surface is provided with ribs or ridges in the longitudinal or circumferential direction, and most preferably in both directions.

If desired, the above mandrel embodiments may be provided with some known device for changing the circumference of the mandrel, in order to further improve the releasing of the casings.

However, this is not essential, and it is one of the advantages of this invention that it is now possible to make a simple massive mandrel without such complicated devices.

Of course, it is not very practical to make a mandrel having ribs or the like on its surface exclusively from wood. It has been ascertained experimentally that other materials are still better suitable for the mandrels of the invention or at least for the projections on their surfaces. One can use any material which is inert to the intestine strips which have been pretreated with acid or lye, in order to make them porous. Thus, the surface which enters into contact with the intestine strips may consist of some suitable metal, e.g. stainless steel, or of some plastic (or plastic coated metal), such as polytetrafluoroethylene, polyamide, polyalkylene, cross-linked resins, etc.

Thus, it is possible to make the whole mandrel of such other material, but it is equally possible to apply e.g. ribs of such other material on a conventional wooden mandrel. In this last respect there are again two possibilities. A conventional wooden mandrel can be provided with ribs or the like in such a way that they form an integral part of the mandrel, but it is also possible to apply some suitable envelop structure around a conventional mandrel. Such an envelop structure may consist of some open wire mesh construction, wherein the meshes may have any form and their sizes may vary within wide limits.

This last mentioned embodiment has great advantages, because it permits to obtain the results of this invention with the use of a conventional mandrel by just putting a preformed wire structure around it.

Thus, the old conventional mandrels in which much money has been invested can still be used, and it is even possible to continue their production, and to leave the user the choice of using them with or without an enveloping wire structure. It is also possible to make sausage casings of different diameters on one and the same mandrel, simply by using wire structures of different thicknesses. Accordingly, such wire structures constitute the most preferred embodiment of this invention.

Some embodiments of the invention have been shown in the accompanying drawing, it being understood that the invention is not limited to the embodiments shown in said drawing, since many variations will be obvious to the expert. In the drawing:

FIG. 1 semi-schematically shows some non-smooth surfaces on a mandrel;

Figure 1:
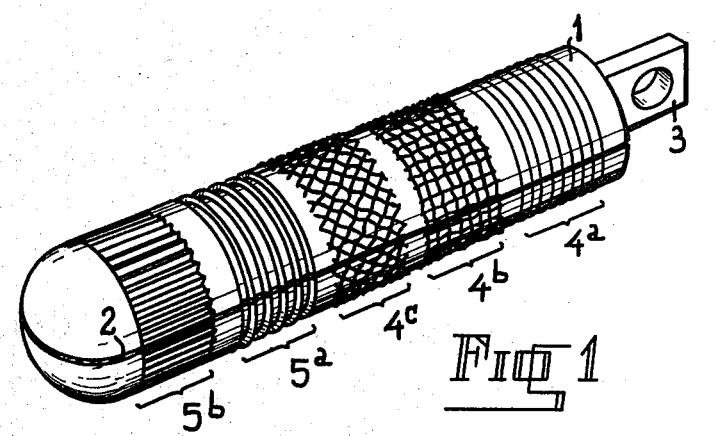

In FIG. 1 the mandrel 1 is made of two halves which can move with respect to each other as shown at 2. The device 3 which is well known per se serves for changing the circumference of the mandrel. As mentioned hereinabove such a mandrel is usually made from wood.

Figure 2:
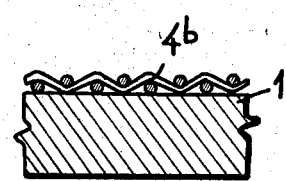
FIG. 2 shows a more detailed view of one of these embodiments in cross-section.

According to the embodiment 4a, metal or plastic wires are removably applied to the mandrel in circumferential direction. In the more preferred embodiment 4b the wires extend both in the circumferential and longitudinal direction, thus forming a mesh structure, which is shown in cross-section in FIG. 2. Another embodiment of such a removable mesh structure is shown with 4c.

Figure 3:
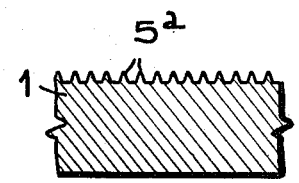
FIG. 3 shows a more detailed view of another of these embodiments in cross-section.

According to the embodiment 5a, the mandrel surface is provided with non-removable circumferential ribs, which are shown in cross-section in FIG. 3. In this embodiment the mandrel, of course, can be made from any material, e.g. some suitable plastic. A similar embodiment, however, with longitudinal ribs is shown in 5b. Of course, the combination of circumferential and longitudinal ribs is also possible, but for reasons of simplicity this embodiment—which for the rest will be clear to the expert—has not been shown in the drawing.

Figure 4:
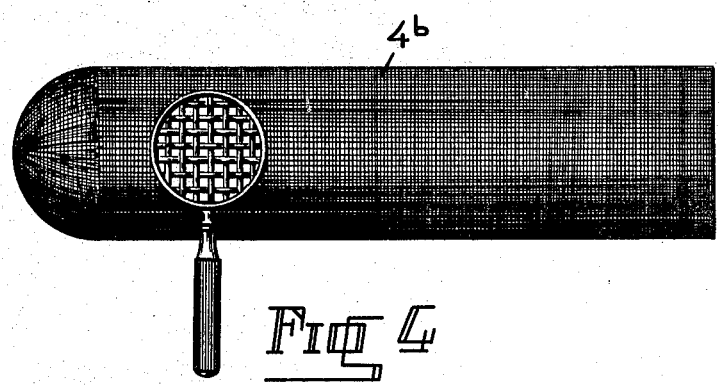
FIG. 4 shows a mandrel entirely provided with a removable wire structure, with a partially enlarged view of said wire structure.

It is to be remarked that FIG. 1 basically shows some usual type of mandrel provided with a known device for changing its circumference. However, the necessity of such a conventional device is obviated by the present invention, as has been mentioned hereinbefore. In accordance therewith FIG. 4 shows a simpler mandrel which has not been provided with such a device. This mandrel may consist of any suitable material such as wood, metal or plastic. Around this mandrel an exchangeable wire construction 4b has been applied.

What I claim is:

1. In a mandrel for making sausage casings by wrapping intestine strips about said mandrel, comprising:
   an elongated cylindrical body portion of substantial axial symmetry having a substantially impervious surface, support means for said body portion at one end thereof, and a rounded portion at the other end of said body portion having a substantially impervious surface, the improvement comprising:
      means to facilitate removal of the produced sausage casings from said mandrel and to reduce the size of entrapped air bubbles between casing layers, said means comprising a removable outer foraminous structure enveloping said elongated body portion and said rounded end portion, said removable outer foraminous structure cooperating with said impervious surface of said elongated cylindrical body portion and said rounded end portion to provide a roughened surface upon which said intestine strips are wrapped.

2. A mandrel according to claim 1 wherein the outer structure is made of wire.

3. A mandrel according to claim 2, wherein the wire structure is predominantly formed of wires in the circumferential direction of the mandrel.

4. A mandrel according to claim 2, wherein the wire structure is predominantly formed of wires in the longitudinal direction of the mandrel.

5. A mandrel according to claim 2, wherein the wire structure has the form of an open mesh structure.

6. A mandrel according to claim 2, wherein the wire structure is made of a material chosen from the group consisting of natural and synthetic fibre materials, metals, plastics, and plastic coated metals.

7. A mandrel according to claim 5 wherein the wires extend both in the circumferential and longitudinal direction.

References Cited

UNITED STATES PATENTS

| 1,791,060 | 2/1931 | Keen | 18—41 |
| 3,298,063 | 1/1967 | French | 18—13 |
| 3,398,428 | 8/1968 | Fuerst et al. | 18—5 |

WILBUR L. McBAY, Primary Examiner

U.S. Cl. X.R.

18—41